United States Patent [19]

Borchers

[11] Patent Number: 5,620,198

[45] Date of Patent: Apr. 15, 1997

[54] COLLAR FOR TRAILER HITCH RECEIVER

[75] Inventor: John R. Borchers, Victoria, Australia

[73] Assignee: Reese Products, Inc., Elkhart, Ind.

[21] Appl. No.: 50,481

[22] PCT Filed: Feb. 26, 1993

[86] PCT No.: PCT/US93/01765

§ 371 Date: Jun. 9, 1994

§ 102(e) Date: Jun. 9, 1994

[87] PCT Pub. No.: WO94/19205

PCT Pub. Date: Sep. 1, 1994

[51] Int. Cl.$^6$ .................................................. B60D 1/60
[52] U.S. Cl. ..................................... 280/507; 280/491.5
[58] Field of Search .................................. 280/507, 511, 280/491.1, 491.2, 491.5

[56] References Cited

U.S. PATENT DOCUMENTS

| | | | |
|---|---|---|---|
| 3,679,231 | 7/1972 | Derr, Jr. | 280/491.1 |
| 3,694,006 | 9/1972 | Good et al. | 280/507 |
| 3,768,837 | 10/1973 | Reese | 280/495 |
| 3,782,761 | 1/1974 | Cardin, Sr. | 280/507 |
| 3,838,872 | 10/1974 | Fullhart | 280/495 |
| 3,911,960 | 10/1975 | Flimon | 138/96 |
| 4,040,641 | 8/1977 | Riecke | 280/507 |
| 4,509,770 | 4/1985 | Young et al. | 280/507 |
| 4,852,902 | 8/1989 | Young et al. | 280/507 |
| 5,184,840 | 2/1993 | Edwards | 280/507 |
| 5,277,448 | 1/1994 | Colibert | 280/491.5 X |

FOREIGN PATENT DOCUMENTS 2257100  6/1993  United Kingdom .................. 280/507

*Primary Examiner*—Kevin Hurley
*Attorney, Agent, or Firm*—King and Schickli

[57] ABSTRACT

A protective collar for installation on a receiver box and a trailer hitch receiver for a vehicle are disclosed. The trailer hitch receiver includes a central frame member and brackets for mounting the frame member to the vehicle. The receiver box is mounted to the frame member and includes a cavity adapted to receive a hitch bar. A protective collar is mounted to the front face of the receiver box defining an opening to the cavity. The collar comprises a body member including an opening for the passage of a mounting end of the hitch bar. The collar includes four interconnected segments, each segment having a substantially L-shaped cross-section. Accordingly, the body member includes a facing portion covering the front face of the receiver box and a mounting flange projecting around the outer periphery of the receiver box.

14 Claims, 1 Drawing Sheet

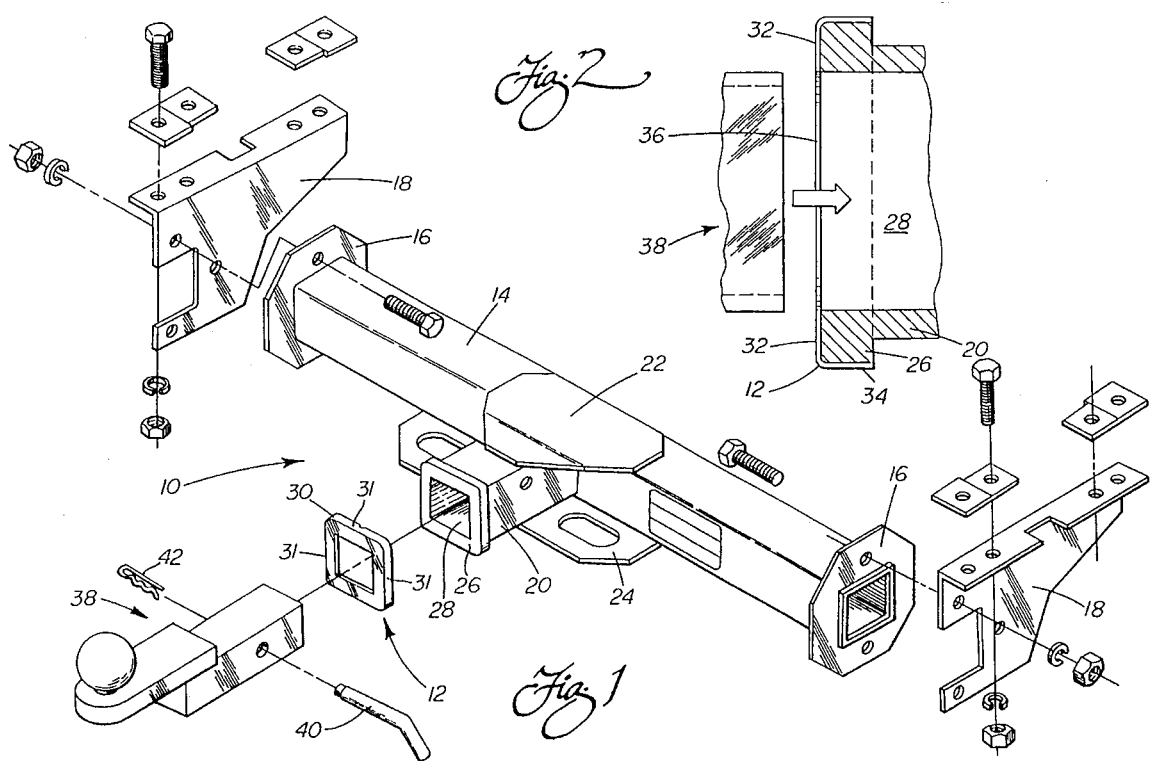

COLLAR FOR TRAILER HITCH RECEIVER

TECHNICAL FIELD

The present invention relates generally to trailer hitch receivers and, more particularly, to a collar or facing plate for improving the ornamental appearance and protecting the finish of the front face of the hitch receiver box.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart, Ind.. Such a hitch receiver is also disclosed in, for example, U.S. Pat. No. 3,768,837 to Reese, owned by Reese Products, Inc., the assignee of the present invention.

It is common practice for operators to remove the hitch bar and ball assembly from the receiver box when the vehicle is not being utilized to tow a trailer. A cap or cover is then positioned in the rearwardly directed opening of the receiver box so as to improve the overall appearance and also prevent dirt from collecting therein. Such covers actually function as plugs that must be removed when it is desired to install the hitch bar and ball assembly for towing.

During installation, individuals often accidently and carelessly strike the face of the receiver box with the end of the hitch bar. Depending upon the force and angle of the contact, the painted finish of the hitch box may be scratched chipped or otherwise damaged. This serves to expose the bare metal to air and moisture. Over time this leads to the formation of rust. Not only is the rust unsightly and ugly but if the receiver box is not refinished, rusting could become so extensive as to eventually lead to unacceptable structural damage.

A need is therefore identified for an approach to limit or prevent damage to the finish of the face of the hitch box thereby extending its service life, reducing maintenance requirements and providing an aesthetically pleasing appearance both when the hitch bar is engaged in and removed from the hitch box.

SUMMARY OF THE INVENTION

Accordingly, it is a primary object of the present invention to provide a collar or face plate for a receiver box of a trailer hitch receiver that is light weight, inexpensive to produce and easy to install.

Yet another object of the present invention is to provide a collar for a trailer hitch receiver box that provides an aesthetically pleasing appearance both when the hitch bar is engaged in the receiver box and when the hitch bar is removed from the receiver box.

An additional object of the invention is to provide a decorative and protective collar that may be retrofitted on existing receiver boxes and still allow utilization of the standard cap or cover for plugging the hitch bar receiving cavity of the receiver box when the hitch bar is removed.

Still another object of the invention is to provide a protective collar for the face of a receiver box that protects the finish of the receiver box from direct contact with the hitch bar during insertion therein. As a result, scratches, chips or other damage to the painted finish are avoided and unsightly rust spots are substantially eliminated.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a collar or face plate is provided for installation on the reinforced face or lip defining the open end of the receiver box of a trailer hitch receiver. More specifically, the protective collar includes a body member having an opening for the passage of a hitch bar of a type that carries, for example, a hitch ball for connection to a trailer. The collar also includes means for mounting the body member over the open end of the receiver box so that the opening is aligned with the cavity of the receiver box adapted to receive the hitch bar.

Still more specifically, the body member is substantially L-shaped in section. The body member includes a facing portion for covering the face end of the receiver box, defining the opening to the receiver box cavity, and a mounting flange projecting around the outer periphery of the receiver box. The collar may be mounted to the receiver box by means of press or interference fit between the mounting flange and the outer periphery of the receiver box and/or by means of adhesive. Preferably, a water tight sealing adhesive is utilized. Such an adhesive effectively prevents water from becoming trapped in the pocket formed between the collar and the receiver box thereby virtually preventing the formation of rust at this interface.

In accordance with yet another aspect of the present invention, the collar may be formed of plastic, stainless steel or aluminum. Such materials advantageously resist rust and corrosion and maintain an attractive and aesthetically pleasing surface condition over extended periods of use.

In accordance with yet another aspect of the present invention, a complete trailer hitch receiver for a vehicle is provided. The hitch receiver includes a central frame member and means for mounting the frame member to the vehicle. The receiver box is mounted to the frame member and a protective collar of the type described is mounted to the face of the receiver box. Advantageously, it should be appreciated that such a collar functionally protects the finish of the receiver box and particularly the face thereof. Specifically, the collar advantageously prevents the striking of the face of the receiver box and, therefore, potential damage to the painted finish of the face when the hitch bar is being inserted. Accordingly, this cause of rust and corrosion is substantially eliminated. Further, it should be appreciated that the collar may be formed from aluminum or stainless steel and provided with a brushed finish that retains an attractive appearance over time. Alternatively, the collar may be molded from plastic in various colors that may be coordinated to the color of the vehicle to which the trailer hitch receiver is mounted.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is an exploded perspective view of a trailer hitch receiver with the protective collar of the present invention;

FIG. 2 is a sectional view of the collar as mounted on the receiver box.

Reference will now be made in detail to the present preferred embodiment of the invention, an example of which is illustrated in the accompanying drawing.

DETAILED DESCRIPTION OF THE INVENTION

Reference is now made to FIG. 1 showing a trailer hitch receiver 10 upon which may be mounted a protective collar or face plate 12. As is known in the art and shown in the figure, the trailer hitch receiver 10 includes a central frame member or cross piece 14 preferably formed from a torque tube of, for example, three inch square steel material. A mounting flange 16 is welded to each end of the central frame member 14. These opposed mounting flanges 16 are secured by nut and bolt fasteners to a pair of vehicle mounting brackets 18 which are then mounted, also with nut and bolt fasteners, to the vehicle in a manner known in the art.

A receiver box 20 is mounted at the centerline of the central frame member 14. As shown, the receiver box 20 is welded to the frame member 14 with upper and lower mounting plates 22, 24, respectively, providing additional support. As further shown in FIG. 1, the receiver box 20 includes a reinforced lip 26 defining an opening leading to a hitch bar receiving cavity 28. The collar 12 is received over this reinforced lip 26 of the receiver box 20.

More particularly, as shown in greater detail in FIG. 2, the collar 12 includes a body member 30 having a substantially L-shaped cross section along anyone of four interconnected segments 31 defining a square overall shape. Thus, the body member 30 includes a facing portion 32 for covering the front face of the reinforced lip 26 and a mounting flange 34 that projects around the outer periphery of the reinforced lip.

The collar 12 may be mounted and held in position by means of a press or interference fit between the mounting flange 34 and the outer periphery of the reinforced lip 26. Alternatively or in addition to this interference fit, an adhesive such as a silicon rubber adhesive 36 may be utilized to improve retention and also seal the interface between the collar and reinforced lip 26 so as to prevent water from becoming trapped therein. In this way, rusting of the underlying reinforced lip 26 of the receiver box 20 is essentially avoided.

As should further be appreciated, the collar 12 includes a centrally located opening that corresponds to the length and width dimensions of the receiver box cavity 28. Further, when the collar 12 is mounted in position on the lip 26, it should be appreciated that this opening 36 is aligned with the cavity 28. Accordingly, the opening 36 functions to provide a passageway for inserting the mounting end of the hitch bar and ball assembly 38 into the receiver box 20. The hitch bar and ball assembly 38 may be held in position in the receiver box 20 by any means known in the art for this purpose including a pull pin 40 and cooperating spring cotter 42 received through aligned, registered holes in the hitch bar and receiver box.

Advantageously, it should be appreciated that the face portion 32 of the collar 12 effectively covers the entire front face of the reinforced lip 26 of the receiver box 20. As a result, the paint finish on that face of the lip 26 is protected from direct contact and striking with the end of the hitch bar and ball assembly 38 as it is inserted. Accordingly, the paint finish does not become scratched, chipped, or damaged in a manner that leads to the prorogation of rust. Thus, this unsightly and potentially damaging problem is essentially avoided by means of the present invention.

In accordance with a further aspect of the present invention, the aesthetic appearance of the trailer hitch receiver is also enhanced. Specifically, the collar 12 may be formed from any material that resists rust and corrosion damage including, for example, plastic, aluminum and stainless steel. Plastic of various colors may be utilized to provide any desired color scheme. Various colors of aluminum/aluminum alloy may also be utilized for the same purpose. Further, it should be appreciated that brushed stainless steel and aluminum maintain their appearance over an extended period of time. Even if sharply struck with the hitch bar and ball assembly 38, the appearance of brushed stainless steel and aluminum may typically be restored by simply rubbing with steel wool or other like material. Of course, any bending or damaging of the collar 12 is substantially prevented by the abutting of the collar against the reinforced lip 26 of the receiver box 20.

Still further, it should be appreciated that the collar 12 may be utilized as a retrofit or aftermarket item. Specifically, it may be mounted to an existing receiver box 20. As the collar 12 includes the opening 36, corresponding in dimension to the hitch bar receiving cavity 28, its mounting does not interfere with the insertion of the hitch bar and ball assembly 38 into the cavity 28 of the receiver box 20. Further, it should be appreciated that the state of the art cap or cover may still be used to plug the cavity when the hitch bar and ball assembly is removed even with the collar in position. Thus, full function of all existing components and hardware is maintained when the collar 12 is used.

In summary, numerous benefits have been described which result from employing the concepts of the present invention. The collar 12 effectively functions to allow an individual to customize the appearance of one's trailer hitch receiver 10 in accordance with personal preference. Accordingly, the aesthetic appearance of the trailer hitch receiver 10 is enhanced. Additionally, the collar 12 functions to protect the reinforced lip 26 at the open end of the receiver box 20 from direct contact and striking with the hitch bar and ball assembly 38 as it is inserted. Accordingly, the painted finish of the front face of the reinforced lip 26 remains undamaged and rust propagation of any exposed metal, a problem common in the prior art, is essentially avoided.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

I claim:

1. A protective collar for installation on a receiver box of a trailer hitch receiver, the receiver box having a cavity adapted to receive a hitch bar, said collar comprising:

a body member including four segments, each segment being substantially L-shaped in section and including a facing portion defining an opening to the receiver box cavity and a mounting flange; and means for mounting said body member over an open end of the receiver box so that said opening is aligned with the cavity in the receiver box.

2. The protective collar set forth in claim 1, wherein said mounting means includes an adhesive.

3. The protective collar set forth in claim 1, wherein said mounting means is by interference fit between said mounting flange and said receiver box.

4. The protective collar set forth in claim 1, wherein said body member is constructed from plastic.

5. The protective collar set forth in claim 1, wherein said body member is constructed from stainless steel.

6. The protective collar set forth in claim 1, wherein said body member is constructed from aluminum.

7. A trailer hitch receiver for a vehicle, comprising:

a central frame member;

a receiver box mounted to said frame member and including a cavity adapted to receive a hitch bar; and a protective collar mounted to a front face of said receiver box defining an opening to said cavity.

8. A trailer hitch receiver for a vehicle, comprising:

a central frame member;

a receiver box mounted to said frame member and including a cavity adapted to receive a hitch bar; and a protective collar mounted to a front face of said receiver box including a body member having an opening for passage of said hitch bar and means for mounting said body member on said receiver box so that said opening is aligned with said cavity.

9. The trailer hitch receiver set forth in claim 8, wherein said body member includes four segments, each segment being substantially L-shaped in section and including (a) a facing portion for covering the face of the receiver box and (b) a mounting flange projecting around the outer periphery of said receiver box.

10. The protective collar set forth in claim 9, wherein said mounting means includes an adhesive.

11. The protective collar set forth in claim 9, wherein said mounting means is by interference fit between said mounting flange and said receiver box.

12. The protective collar set forth in claim 9, wherein said body member is constructed from plastic.

13. The protective collar set forth in claim 9, wherein said body member is constructed from stainless steel.

14. The protective collar set forth in claim 9, wherein said body member is constructed from aluminum.

* * * * *